(12) United States Patent
Yu et al.

(10) Patent No.: US 12,018,346 B2
(45) Date of Patent: Jun. 25, 2024

(54) METHOD FOR EXTRACTING VALUABLE METAL FROM LOW-MATTE NICKEL CONVERTER SLAG

(71) Applicants: GUANGDONG BRUNP RECYCLING TECHNOLOGY CO., LTD., Guangdong (CN); HUNAN BRUNP RECYCLING TECHNOLOGY CO., LTD., Hunan (CN); HUNAN BRUNP EV RECYCLING CO., LTD., Hunan (CN)

(72) Inventors: Haijun Yu, Guangdong (CN); Yinghao Xie, Guangdong (CN); Aixia Li, Guangdong (CN); Xuemei Zhang, Guangdong (CN); Changdong Li, Guangdong (CN)

(73) Assignees: Guangdong Brunp Recycling Technology Co., Ltd., Guangdong (CN); Hunan Brunp Recycling Technology Co., Ltd., Hunan (CN); Hunan Brunp Ev Recycling Co., Ltd., Hunan (CN)

( * ) Notice: Subject to any disclaimer, the term of this patent is extended or adjusted under 35 U.S.C. 154(b) by 0 days.

(21) Appl. No.: 18/260,235

(22) PCT Filed: Jun. 6, 2022

(86) PCT No.: PCT/CN2022/097181
§ 371 (c)(1),
(2) Date: Jun. 30, 2023

(87) PCT Pub. No.: WO2023/000845
PCT Pub. Date: Jan. 26, 2023

(65) Prior Publication Data
US 2024/0035116 A1    Feb. 1, 2024

(30) Foreign Application Priority Data

Jul. 21, 2021    (CN) .......................... 202110823724.6

(51) Int. Cl.
*C22B 3/00*    (2006.01)
*C22B 1/02*    (2006.01)
(Continued)

(52) U.S. Cl.
CPC ............ *C22B 23/0484* (2013.01); *C22B 1/02* (2013.01); *C22B 7/005* (2013.01); *C22B 7/007* (2013.01);
(Continued)

(58) Field of Classification Search
CPC ....... C22B 23/0484; C22B 1/02; C22B 7/005; C22B 7/04; C22B 23/005; C22B 23/0446
(Continued)

(56) References Cited

U.S. PATENT DOCUMENTS 4,468,302 A    8/1984    Parker et al.
11,459,636 B2 *    10/2022    Zhao .................. C22B 15/0028

FOREIGN PATENT DOCUMENTS

CA    2363969 A1    5/2003
CN    103614547 A    3/2014
(Continued)

OTHER PUBLICATIONS

International Search Report in PCT/CN2022/097181, mailed Sep. 5, 2022, 5 pages.

*Primary Examiner* — Melissa S Swain
(74) *Attorney, Agent, or Firm* — ArentFox Schiff LLP

(57) ABSTRACT

Disclosed in the present invention is a method for extracting valuable metal from low-matte nickel converter slag. The method comprises: mixing low-matte nickel converter slag and quicklime then calcinating, obtaining a calcinated mate-
(Continued)

rial; grinding and magnetically separating the calcinated material, obtaining silicate and iron-rich slag; adding a strong alkali solution to the iron-rich slag to perform leaching processing, and performing solid-liquid separation, obtaining a filtrate and a residue; mixing the residue with an acid solution, performing oxygen pressure acid leaching, and performing solid-liquid separation, obtaining a leachate and iron oxide; introducing hydrogen sulfide gas into the leachate, adjusting the pH, and performing solid-liquid separation, obtaining a copper sulfide precipitate and a nickel-cobalt-containing filtrate. In the present invention, first, removing silicon dioxide is removed by means of calcination to prepare silicate, then iron oxide is prepared by means of acid leaching, and finally metal separation is performed on the leachate, causing various components of the converter slag to be effectively utilized. The process flow of the present invention is short and effectively utilizes each component of the low-matte nickel converter slag, waste is turned into valuable material, and the loss of valuable metal elements is reduced.

5 Claims, 1 Drawing Sheet

(51) Int. Cl.
  *C22B 7/00*   (2006.01)
  *C22B 7/04*   (2006.01)
  *C22B 23/00*  (2006.01)

(52) U.S. Cl.
  CPC ............... *C22B 7/008* (2013.01); *C22B 7/04* (2013.01); *C22B 23/005* (2013.01); *C22B 23/0415* (2013.01); *C22B 23/0446* (2013.01); *C22B 23/0461* (2013.01)

(58) Field of Classification Search
  USPC ....................................................... 423/150.3
  See application file for complete search history.

(56) References Cited

FOREIGN PATENT DOCUMENTS

| | | | |
|---|---|---|---|
| CN | 105018728 | A | 11/2015 |
| CN | 105907944 | A | 8/2016 |
| CN | 107475511 | A | 12/2017 |
| CN | 107674984 | A | 2/2018 |
| CN | 108011149 | A | 5/2018 |
| CN | 108232351 | A | 6/2018 |
| CN | 109231245 | A | 1/2019 |
| CN | 110512083 | A | 11/2019 |
| CN | 110629015 | A | 12/2019 |
| CN | 110777257 | A | 2/2020 |
| CN | 110923462 | A | 3/2020 |
| CN | 111100992 | A | 5/2020 |
| CN | 111118294 | A | 5/2020 |
| CN | 112695205 | A | 4/2021 |
| CN | 113621819 | A | 11/2021 |

* cited by examiner

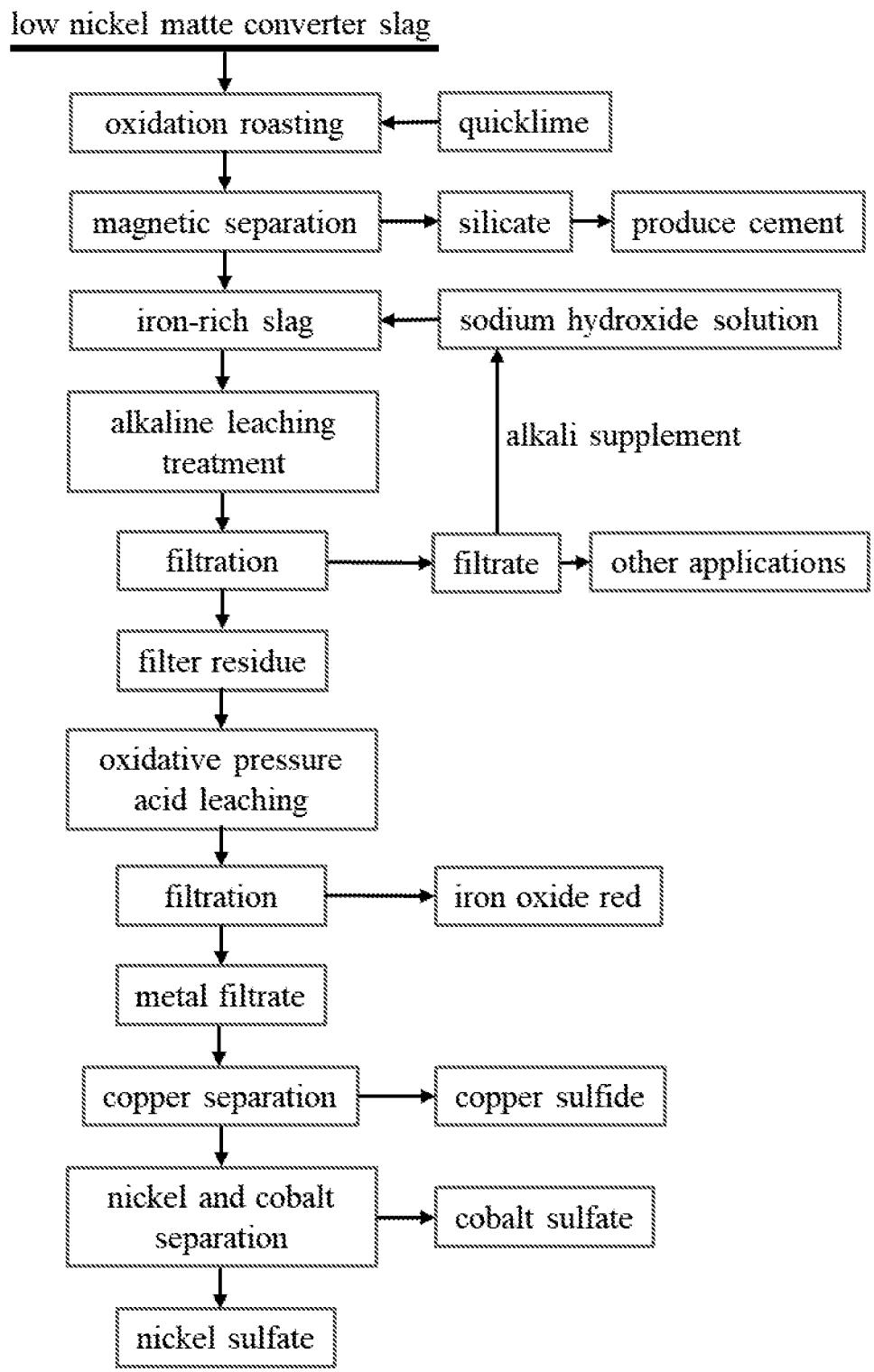

METHOD FOR EXTRACTING VALUABLE METAL FROM LOW-MATTE NICKEL CONVERTER SLAG

CROSS REFERENCE TO RELATED APPLICATION(S)

This application is a National Phase entry of PCT Application No. PCT/CN2022/097181, entitled "METHOD FOR EXTRACTING VALUABLE METAL FROM LOW-MATTE NICKEL CONVERTER SLAG" and filed on Jun. 6, 2022, which claims priority of Chinese Application No. 202110823724.6 entitled "METHOD FOR EXTRACTING VALUABLE METAL FROM LOW-MATTE NICKEL CONVERTER SLAG" and filed on Jul. 21, 2021, both of which are expressly incorporated by reference herein in their entirety.

TECHNICAL FIELD

The present disclosure relates to a metallurgical technology field, and specifically relates to a method for extracting valuable metals from low nickel matte converter slags.

BACKGROUND

Low nickel matte is an intermediate product of the matte smelting in the traditional pyrometallurgy process. The main phase compositions of the low nickel matte, which is a substance with a more complex composition, are some sulfides and sulfide solutions thereof, such as $Ni_3S_2$, $Cu_2S$, $(Fe, Ni)_9S_8$, etc.

In the conventional production process of nickel, a nickel concentrate is first dried and matte smelted to produce the low nickel matte. Because the low nickel matte obtained by matte smelting is insufficient in composition to meet the processing requirements of the refining process, thus it needs to be further melted by blowing into a high nickel matte to remove the iron and part of the sulfur, wherein the iron therein needs to be blown to less than 4%, then a high nickel matte containing about 70% of copper and nickel is obtained, and then a grinding flotation is performed to the high nickel matte to obtain a secondary nickel concentrate, a secondary copper concentrate and a primary alloy, which are used as raw materials for nickel, copper and precious metal production, respectively.

In the process of melting by blowing low nickel matte into high matte nickel, the converter temperature needs to reach 1200° C. to 1300° C., and the time of melting by blowing is as long as 8 h to 10 h. Most of Co and part of Ni as well as Cu will oxidize and slag together with iron to form converter slags, which causes a waste of resources.

In order to recover the cobalt and other valuable metals therein, in the traditional pyrometallurgical matte process of sulfide ore, when converter melting by blowing the low nickel matte into the high nickel matte, there are usually two methods for the recovery of converter slags. In one method, the obtained converter slag is then sent to an electric cleaning furnace, and repeated smelted, such that the valuable metals are enriched in the high nickel matte and entered an anolyte together with the nickel during electrolytic refining of nickel.

However, enriching the cobalt in valuable metals into high nickel matte makes the loss of cobalt up to about 50%, and the whole process causes repeated circulation of materials, repeated energy consumption, and serious environmental pollution. In the other method, the converter slag is reduction smelted or reduction sulfide smelted to obtain a cobalt matte or a cobalt alloy, which is then subjected to wet processing alone. This method has complex parameters, high reaction temperature, and high energy consumption.

Therefore, there is a need for a method for extracting valuable metals from low nickel matte converter slags, to extract valuable metal elements in the converter slags and improve resource utilization.

SUMMARY

The present disclosure aims to solve at least one of the technical problems existing in the above-mentioned prior art. For this reason, the present disclosure proposes a method for extracting valuable metals from low nickel matte converter slags. In this method, silica is firstly removed by roasting to prepare silicate, then an iron oxide red is prepared by acid leaching, and finally metals are separated from the leaching solution, which makes the best use of the various components in the converter slags.

According to one aspect of the present disclosure, a method is provided for extracting a valuable metal from a low nickel matte converter slag, which includes the following steps:
S1: mixing the low nickel matte converter slag with quicklime, then roasting to obtain a roasted material;
S2: performing a grinding and a magnetic separation to the roasted material to obtain a silicate and an iron-rich slag;
S3: adding a strong alkali solution to the iron-rich slag for a leaching treatment, and performing a solid-liquid separation to obtain a filtrate and a filter residue;
S4: mixing the filter residue with an acid solution to perform an oxidative pressure acid leaching, then performing a solid-liquid separation to obtain a leaching solution and an iron oxide red; and
S5: introducing a hydrogen sulfide gas into the leaching solution, adjusting pH, then performing a solid-liquid separation to obtain a copper sulfide precipitate and a nickel-cobalt-containing filtrate.

In some embodiments of the present disclosure, in step S1, a mass ratio of the quicklime and the low nickel matte converter slag is (0.1-0.3):1.

In some embodiments of the present disclosure, in step S1, a temperature of the roasting is 800° C. to 1350° C.; preferably, a time of the roasting is 0.5 h to 2.0 h.

In some embodiments of the present disclosure, in step S2, the roasted material after grinding has a particle size of ≤100 μm; preferably, a magnetic field intensity of the magnetic separation is 500 GS to 1500 GS.

In some embodiments of the present disclosure, in step S2, the silicate can be used to produce cement.

In some embodiments of the present disclosure, in step S3, the strong alkali solution has a concentration of 0.1 mol/L to 4.0 mol/L; preferably, the leaching treatment is 0.5 h to 3.0 h. The strong alkali solution is used to further dissolve the silicate compound and aluminum, etc. therein to facilitate the subsequent acid leaching and increase the leaching rate of the oxidative pressure acid leaching.

In some embodiments of the present disclosure, in step S3, the filtrate can be recycled after supplementing with the strong alkali solution, or can be used to prepare sodium silicate after aluminum is extracted.

In some embodiments of the present disclosure, in step S3, the strong alkali solution is one or two of sodium hydroxide or potassium hydroxide.

In some embodiments of the present disclosure, in step S4, a solid-to-liquid ratio of the filter residue and the acid solution is 1 g: (0.5-5) mL. Preferably, the acid solution is sulfuric acid.

In some embodiments of the present disclosure, in step S4, the oxidative pressure acid leaching has an oxygen partial pressure of 350 kPa to 700 kPa, a temperature of 160° C. to 225° C., and a pH of 2.0 to 3.0. Such parameters ensure the reaction rate, and the appearance of ferric ions in the solution is further suppressed. Iron is presented in the form of iron oxide, which greatly saves the amount of used acid solution.

In some embodiments of the present disclosure, in step S5, the pH is 0 to 2.0.

In some embodiments of the present disclosure, in step S5, an adjusting agent for adjusting pH is one or more of sulfuric acid, nickel hydroxide, nickel carbonate, cobalt hydroxide or cobalt carbonate, which avoids the introduction of other impurity ions.

In some embodiments of the present disclosure, in step S5, the method further includes an extraction process and a back-extraction process to the nickel-cobalt-containing filtrate: adding an extractant to the nickel-cobalt-containing filtrate, then separating to obtain an extracted nickel-containing organic phase and a cobalt-containing raffinate, and then back-extracting nickel from the extracted nickel-containing organic phase with a sulfuric acid solution to obtain a nickel sulfate solution. The extraction and back-extraction can further separate nickel and cobalt.

In some preferred embodiments of the present disclosure, the extractant is one or more selected from P204, P507, DEHPA, and Cyanex272.

In some preferred embodiments of the present disclosure, the sulfuric acid solution has a concentration of 3 mol/L to 5 mol/L.

In some preferred embodiments of the present disclosure, the extracted organic phase obtained after the back-extraction can be re-saponified and recycled.

A preferred embodiment of the present disclosure has at least the following beneficial effects:

In the present disclosure, silica is firstly removed by roasting to prepare silicate, then an iron oxide red is prepared by acid leaching, and finally metals are separated from the leaching solution, which makes the best use of the various components in the converter slags. During oxidation roasting, a large amount of $FeSiO_3$ in the low nickel matte converter slag is converted into $CaO \cdot SiO_2$, $2CaO \cdot SiO_2$, $3CaO \cdot SiO_2$ and $Fe_3O_4$ with magnetism, and the sulfur in the low nickel matte converter slag is fixed to the quicklime, impurities such as aluminum and magnesium are also converted into $MgO \cdot SiO_2$ and $3CaO \cdot Al_2O_3$, while the nickel, cobalt and copper therein are converted into a ferrite. After magnetic separation, the silicate can be used to produce cement, and the iron-rich slag is mainly composed of $Fe_3O_4$, $NiFe_2O_4$, $CoFe_2O_4$, $CuFe_2O_4$, FeO, and a small amount of silicon aluminum oxide. In order to further improve the subsequent acid leaching rate, the strong alkaline solution is used to remove silicon and aluminum impurities, leaving other elements exposed to facilitate leaching. In the oxidative pressure acid leaching process, by controlling the temperature and pH, the reaction rate is ensured, and the appearance of ferric ions in the solution is further suppressed. Iron will exist in the form of iron oxide, which greatly saves the amount of acid solution used. During the reaction, nickel, copper, cobalt, etc. are dissolved in the solution, and iron becomes solid iron oxide red in the form of iron oxide. During the metal separation process, the hydrogen sulfide gas is introduced to precipitate and separate copper ions in the form of copper sulfide, while nickel and cobalt ions remain in the solution. The present disclosure has a simple process, which enables effective utilization of every component of low nickel matte converter slags, turning waste into treasure, and reducing the loss of valuable metal elements.

BRIEF DESCRIPTION OF THE DRAWINGS

The present disclosure will be further described in details accompanying with the accompanying drawings and examples.

FIG. 1 is a process flowchart of Example 1 of the present disclosure.

DETAILED DESCRIPTION OF THE EMBODIMENTS

Hereinafter, the concept of the present disclosure and the technical effects produced will be described clearly and completely with reference to the examples, so as to fully understand the purpose, features and effects of the present disclosure. It is apparent that the described examples are only a part of the examples of the present disclosure, and not all of the examples, and other examples obtained by those skilled in the art based on the examples of the present disclosure without creative efforts fall within the protection scope of the present disclosure.

Example 1

A method is provided for extracting a valuable metal from a low nickel matte converter slag. The main components of the low nickel matte converter slag are: nickel: 1.38%, cobalt: 0.65%, copper: 0.78%, iron: 51.29%, silicon: 27.88%. Referring to FIG. 1, the valuable metals were extracted and separated by the following steps:

(1) oxidation roasting: the converter slag produced by melting by blowing the low nickel matte into the high matte was mixed with quicklime and roasted in the air; the mass ratio of the quicklime to converter slag was controlled to be 0.3:1, the roasting temperature was 1350° C., and the roasting time was 0.5 h;

(2) magnetic separation: after grinding the roasted material obtained in step (1) until a particle size thereof was ≤100 μm, magnetic separation was performed with a magnetic field strength of 500 GS to obtain a silicate and an iron-rich slag; and the silicate obtained by separation can be used to produce cement;

(3) alkaline leaching treatment: the iron-rich slag obtained in step (2) was added with 0.1 mol/L of sodium hydroxide solution, and leached for 3.0 h;

(4) filtration: after leaching of step (3) was completed, a filtrate and a filter residue were obtained by solid-liquid separation; the filtrate can be recycled after supplementing with sodium hydroxide, alternatively, the filtrate can also be used to prepare sodium sulfate after extracting aluminum;

(5) oxidative pressure acid leaching: an oxygen pressure acid leaching was performed to the filter residue obtained in step (4) using sulfuric acid, and a solid-to-liquid ratio of the raw materials was controlled to be 1 g: 5 mL, a oxygen partial pressure was 350 kPa to 400 kPa, a temperature was 160° C. to 170° C., and pH was 2.0 to 3.0;

(6) secondary filtration: after step (5) was completed, solid-liquid separation is performed to obtain a leaching solution containing valuable metals and an iron oxide red;

(7) copper separation: a hydrogen sulfide gas was introduced into the leaching solution obtained in step (6), and the pH was adjusted to 0 to 2.0 using sulfuric acid, then a copper sulfide precipitate was obtained by separating;

(8) nickel and cobalt separation: an extractant P204 was added to the filtrate in step (7) after copper sulfide was separated, an extracted nickel-containing organic phase and a cobalt-containing raffinate were obtained by separating; and the cobalt-containing raffinate could be used to prepare cobalt sulfate, nickel was back-extracted from the extracted nickel-containing organic phase using a sulfuric acid solution with a concentration of 3 mol/L to obtain a nickel sulfate solution.

35.97 g nickel sulfate, 16.92 g cobalt sulfate, and 11.60 g copper sulfide could be obtained from each kilogram of the low nickel matte converter slag. It can be seen that the recovery rate of nickel was about 98.8%, the recovery rate of cobalt was about 98.9%, and the recovery rate of copper was about 98.8%.

Example 2

A method is provided for extracting a valuable metal from a low nickel matte converter slag. The main components of the low nickel matte converter slag are: nickel 1.13%, cobalt: 0.58%, copper: 0.43%, iron: 49.38%, silicon: 25.82%. The valuable metals were extracted and separated by the following steps:

(1) oxidation roasting: the converter slag produced by melting by blowing the low nickel matte into the high matte was mixed with quicklime and roasted in the air; the mass ratio of the quicklime to converter slag was controlled to be 0.2:1, the roasting temperature was 1100° C., and the roasting time was 1.0 h;

(2) magnetic separation: after grinding the roasted material obtained in step (1) until a particle size thereof was ≤100 μm, magnetic separation was performed with a magnetic field strength of 1000 GS to obtain a silicate and an iron-rich slag; and the silicate obtained by separation can be used to produce cement;

(3) alkaline leaching treatment: the iron-rich slag obtained in step (2) was added with 2.0 mol/L of sodium hydroxide solution and leached for 1.5 h;

(4) filtration: after leaching of step (3) was completed, a filtrate and a filter residue were obtained by solid-liquid separation; the filtrate can be recycled after supplementing with sodium hydroxide, alternatively, the filtrate can also be used to prepare sodium sulfate after extracting aluminum;

(5) oxidative pressure acid leaching: an oxygen pressure acid leaching was performed to the filter residue obtained in step (4) using sulfuric acid, and a solid-to-liquid ratio of the raw materials was controlled to be 1 g: 2.5 mL, a oxygen partial pressure was 500 kPa to 550 kPa, a temperature was 190° C. to 200° C., and pH was 2.0 to 3.0;

(6) secondary filtration: after step (5) was completed, solid-liquid separation is performed to obtain a leaching solution containing valuable metals and an iron oxide red;

(7) copper separation: a hydrogen sulfide gas was introduced into the leaching solution obtained in step (6), and the pH was adjusted to 0 to 2.0 using sulfuric acid, then a copper sulfide precipitate was obtained by separating;

(8) nickel and cobalt separation: an extractant P507 was added to the filtrate in step (7) after copper sulfide was separated, an extracted nickel-containing organic phase and a cobalt-containing raffinate were obtained by separating; and the cobalt-containing raffinate could be used to prepare cobalt sulfate, nickel was back-extracted from the extracted nickel-containing organic phase using a sulfuric acid solution with a concentration of 4 mol/L to obtain a nickel sulfate solution.

29.63 g nickel sulfate, 15.19 g cobalt sulfate, and 6.45 g copper sulfide could be obtained from each kilogram of the low nickel matte converter slag. It can be seen that the recovery rate of nickel was about 99.4%, the recovery rate of cobalt was about 99.5%, and the recovery rate of copper was about 99.7%.

Example 3

A method is provided for extracting a valuable metal from a low nickel matte converter slag. The main components of the low nickel matte converter slag are: nickel 0.93%, cobalt: 0.71%, copper: 0.38%, iron: 52.64%, silicon: 22.13%. The valuable metals were extracted and separated by the following steps:

(1) oxidation roasting: the converter slag produced by melting by blowing the low nickel matte into the high matte was mixed with quicklime and roasted in the air; the mass ratio of the quicklime to converter slag was controlled to be 0.1:1, the roasting temperature was 800° C., and the roasting time was 2.0 h;

(2) magnetic separation: after grinding the roasted material obtained in step (1) until a particle size thereof was ≤100 μm, magnetic separation was performed with a magnetic field strength of 1500 GS to obtain a silicate and an iron-rich slag; and the silicate obtained by separation can be used to produce cement;

(3) alkaline leaching treatment: the iron-rich slag obtained in step (2) was added with 4.0 mol/L of sodium hydroxide solution and leached for 0.5 h;

(4) filtration: after leaching of step (3) was completed, a filtrate and a filter residue were obtained by solid-liquid separation; the filtrate can be recycled after supplementing with sodium hydroxide, alternatively, the filtrate can also be used to prepare sodium sulfate after extracting aluminum;

(5) oxidative pressure acid leaching: an oxygen pressure acid leaching was performed to the filter residue obtained in step (4) using sulfuric acid, and a solid-to-liquid ratio of the raw materials was controlled to be 1 g: 0.5 mL, a oxygen partial pressure was 650 kPa to 700 kPa, a temperature was 210° C. to 225° C., and pH was 2.0 to 3.0;

(6) secondary filtration: after step (5) was completed, solid-liquid separation is performed to obtain a leaching solution containing valuable metals and an iron oxide red;

(7) copper separation: a hydrogen sulfide gas was introduced into the leaching solution obtained in step (6), and the pH was adjusted to 0 to 2.0 using sulfuric acid, then a copper sulfide precipitate was obtained by separating;

(8) nickel and cobalt separation: an extractant Cyanex272 was added to the filtrate in step (7) after copper sulfide was separated, an extracted nickel-containing organic phase and a cobalt-containing raffinate were obtained by separating; and the cobalt-containing raffinate could be used to prepare cobalt sulfate; nickel was back-extracted from the extracted nickel-containing organic phase using a sulfuric acid solution with a concentration of 5 mol/L to obtain a nickel sulfate solution.

29.63 g nickel sulfate, 15.19 g cobalt sulfate, and 6.45 g copper sulfide could be obtained from each kilogram of the low nickel matte converter slag. It can be seen that the recovery rate of nickel was about 99.7%, the recovery rate of cobalt was about 99.7%, and the recovery rate of copper was about 99.5%.

The embodiments of the present disclosure are described in detail above with reference to the drawings, but the present disclosure is not limited to the above-mentioned embodiments, and various changes can be made without departing from the purpose of the present disclosure within the scope of knowledge possessed by those of ordinary skill in the art. In addition, embodiments in the present disclosure and features in the embodiments can be combined with each other under the premise of no conflict.

What is claimed is:

1. A method for extracting a valuable metal from a low nickel matte converter slag, comprising the following steps:
   S1: mixing a low nickel matte converter slag with quicklime, then roasting to obtain a roasted material; the low nickel matte converter slag contains $FeSiO_3$; a mass ratio of the quicklime and the low nickel matte converter slag is (0.1-0.3):1; a temperature of the roasting is 800° C. to 1350° C.; and a time of the roasting is 0.5 h to 2.0 h;
   S2 performing a grinding and a magnetic separation to the roasted material to obtain a silicate and an iron-rich slag;
   S3: adding a strong alkali solution to the iron-rich slag for a leaching treatment, and performing a solid-liquid separation to obtain a filtrate and a filter residue; the strong alkali solution has a concentration of 0.1 mol/L to 4.0 mol/L; and a time of the leaching treatment is 0.5 h to 3.0 h;
   S4: mixing the filter residue with an acid solution to perform an oxidative pressure acid leaching, then performing a solid-liquid separation to obtain a leaching solution and an iron oxide red; a solid-to-liquid ratio of the filter residue and the acid solution is 1 g: (0.5-5) mL; the oxidative pressure acid leaching has an oxygen partial pressure of 350 kPa to 700 kPa, a temperature of 160° C. to 225° C., and a pH of 2.0 to 3.0;
   S5: introducing a hydrogen sulfide gas into the leaching solution, adjusting pH, then performing a solid-liquid separation to obtain a copper sulfide precipitate and a nickel-cobalt-containing filtrate;
   wherein a mass content of nickel in the low nickel matte converter slag is 0.93 wt % to 1.38 wt %.

2. The method according to claim 1, wherein in step S2, the roasted material after grinding has a particle size of ≤100 μm; a magnetic field intensity of the magnetic separation is 500 GS to 1500 GS.

3. The method according to claim 1, wherein in step S5, the pH is 0 to 2.0.

4. The method according to claim 1, wherein in step S5, an adjusting agent for adjusting pH is one or more of sulfuric acid, nickel hydroxide, nickel carbonate, cobalt hydroxide or cobalt carbonate.

5. The method according to claim 1, wherein in step S5, further comprising an extraction process and a back-extraction process to the nickel-cobalt-containing filtrate: adding an extractant to the nickel-cobalt-containing filtrate, then separating to obtain an extracted nickel-containing organic phase and a cobalt-containing raffinate, and then back-extracting nickel from the extracted nickel-containing organic phase with a sulfuric acid solution to obtain a nickel sulfate solution.

* * * * *